United States Patent
Smith

(10) Patent No.: US 7,159,405 B1
(45) Date of Patent: Jan. 9, 2007

(54) TEMPERATURE CONTROL OF GAS FILLING PROCESS

(75) Inventor: John P. Smith, Clark, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 11/256,897

(22) Filed: Oct. 24, 2005

(51) Int. Cl.
  *F25B 9/02* (2006.01)
  *F17C 13/00* (2006.01)
(52) U.S. Cl. .............................. 62/5; 62/50.7
(58) Field of Classification Search ........ 62/50.7, 62/50.1, 5

See application file for complete search history.

(56) References Cited

U.S. PATENT DOCUMENTS 4,011,732 A * 3/1977 Doherty et al. ............. 62/50.7
6,134,893 A * 10/2000 Bonn ......................... 62/50.7

* cited by examiner

*Primary Examiner*—Melvin Jones
*Assistant Examiner*—Michael J. Early
(74) *Attorney, Agent, or Firm*—Philip H. Von Neida

(57) ABSTRACT

The present invention provides for a method and apparatus for controlling and raising the temperature of a fitting used to transfer liquefied gas to a storage vessel. A hollow metal tube containing heated inert gas contacts the fitting such that heat is transferred to the fitting. By raising the temperature of the fitting, problems such as leakage due to freezing the o-ring seal can be reduced. The method utilizes a vortex tube as the heat source to avoid problems with sparking when an incendiary gas such as hydrogen is being transferred to the storage vessel.

26 Claims, 4 Drawing Sheets

TEMPERATURE CONTROL OF GAS FILLING PROCESS

BACKGROUND OF THE INVENTION

The present invention provides for an apparatus and method of providing temperature control to a fitting used in filling liquefied gas storage tanks. More particularly the present invention relates to the use of a temperature control device to the contact the bayonet fitting used during liquid hydrogen filling operations.

When hydrogen is delivered for storage in tanks, it is inputted into the tanks through a filling hose and nozzle. This nozzle or bayonet fitting will connect the delivery medium to the tank and allow for hydrogen to fill the tank. During this filling operation, the bayonet fitting will get cold. This is particularly true when high purity hydrogen is being inputted into the tank because of the long purge times required by that operation.

The result of this drop in temperature causes the materials of construction of the bayonet fitting to contract, there by causing looseness in the seals. This will cause the connection to leak which provides not only in loss of delivered product but also causes unsafe conditions. The typical treatment for warming the bayonet fitting is for the operators of the facility to pour warm water on the bayonet to control its temperature. While this would work to keep the bayonet fitting from leaking, the water that accumulates around the base of the storage tank would often freeze during colder weather creating unsafe conditions. This resulted in sporadic control of the temperature of the bayonet fitting and the subsequent loss of hydrogen being delivered.

The present inventor has discovered a means by which the temperature of the bayonet fitting can be controlled automatically and remotely to inhibit the loss of hydrogen product being delivered and improve safety around the delivery storage tanks.

SUMMARY OF THE INVENTION

The present invention provides for an apparatus and a method for controlling or raising the temperature of a fitting used to transfer liquefied gas to a storage vessel. The method comprises contacting the fitting with means to control or raise the temperature of the fitting. Typically the gas that is being transferred is liquefied hydrogen gas which is being fed from a vehicle used for delivering gas to facilities containing storage tanks. The fitting is a bayonet fitting which will integrate the tube delivering the liquefied gas to the inlet of the storage tank.

For purposes of the present invention, the bayonet fitting is a two piece construct which has a male end and a female end. The discussion and description of the invention and drawings will be focussed on the male end of the bayonet fitting.

The means to control or raise the temperature of the fitting is a hollow metal tube which is shaped so as to make as much surface area contact with the fitting to transfer heat energy to the fitting. Typically, this means is a metal tube which will allow for the flow of warm gas through it and being shaped in a circular fashion to maximize surface area contact with the fitting. The metal tube can be made of any metal that will efficiently transfer heat and is selected from the group consisting of copper and aluminum.

The warm gas that flows through the tube is any inert gas. Preferably this gas is nitrogen however, other gases including helium or argon, may be employed in the method. The gas may be delivered from a cylinder or other means such as an on-site generator, all depending upon the needs of the operator.

The gas that is delivered to the metal tube is heated by a device such that when it travels through the tube, it transfers heat to the tube and on to the fitting. To maximize the efficiency of the heat transfer, the heat tube is insulated to prevent heat lost to the environment. This will raise the temperature of the fitting such that problems such as freezing do not occur. The heat source can be any source that can be controlled in delivering temperature to the metal tube through the gas. However, in one embodiment of the present invention, hydrogen is the liquefied gas that is being delivered to storage. As such, the heat source preferably is one where there is no chance of electric spark or other means to ignite the hydrogen gas. Preferably then the heat source means is a vortex tube.

Alternatively, the hollow metal tube can be two separate hollow metal tubes which will each have a flow of gas through them to transfer heat to the bayonet fitting.

The present invention also provides for an apparatus for controlling and raising the temperature of a storage vessel fitting which comprises: contact means; gas source means; and heat source means.

In an alternative embodiment of the present invention, the present invention provides for a method for inhibiting the freezing of a fitting used to transfer gas to a storage vessel comprising contacting said fitting with means to control/raise its temperature.

DETAILED DESCRIPTION OF THE INVENTION

Figure 1:
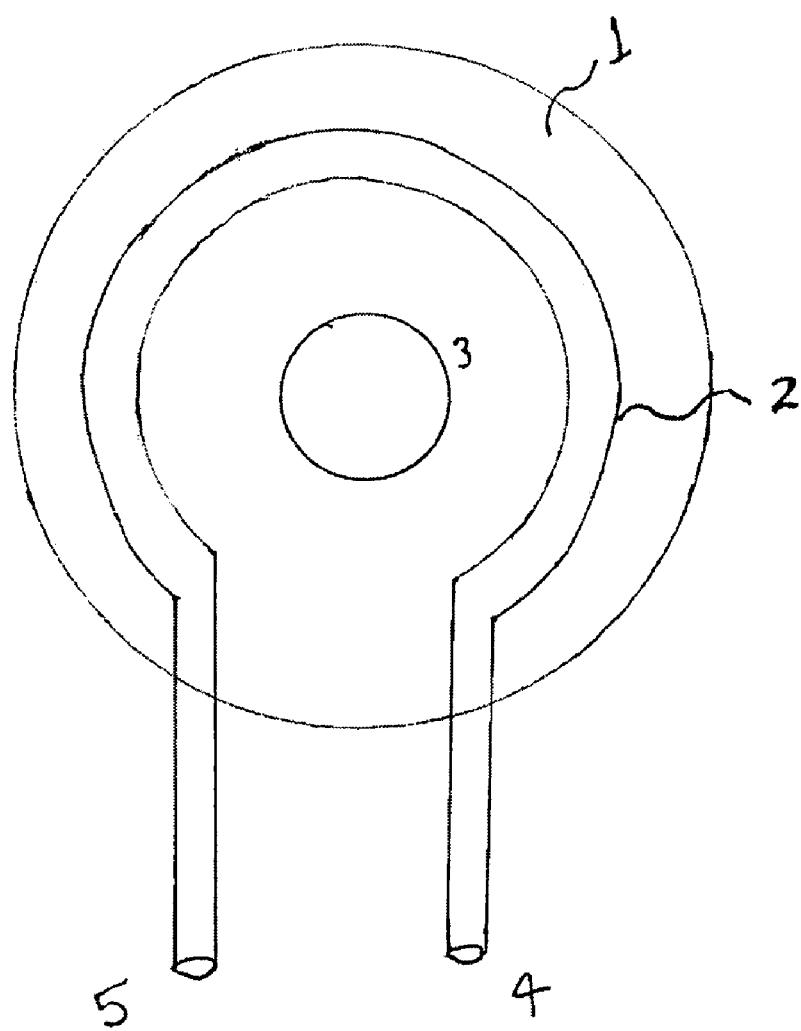
FIG. 1 is a view looking at the end of the bayonet fitting showing the position of the hollow ring assembly.

Turning to the drawings, FIG. 1 is an end view of a bayonet fitting which shows the relative position of the apparatus for transferring heat to the fitting. The bayonet fitting is a circular device that connects one end to the liquefied gas storage tank, not shown, to the tube or hose that will inject the liquefied gas for storage into the tank. The face of the bayonet fitting 1 will be contacted by the hollow metal tube 2. Depending upon the configuration of the bayonet fitting a hollow groove may be present in the face which allows for the hollow metal tube 2 to be recessed into the face of the bayonet fitting 1. As noted, the bayonet fitting allows the liquefied gas to be delivered to flow into the storage tank through hole 3 such that there is minimal leakage of the gas.

The hollow metal tube 2 may be mounted to the bayonet fitting 1 by conventional means such as by welding, brazing, soldering, tack welding, glue or other fastening device.

The gas that is employed in the heating process enters the hollow metal tube through opening 4. The gas that is employed in the present invention may be any inert gas that will upon being raised in temperature will be able to impart heat to the hollow metal tube and to the bayonet fitting.

Preferably, nitrogen is employed but other inerts such as helium or argon may be employed. The source of the gas may be any convenient source such as a gas cylinder or other on-site generation equipment. The gas source may also be off gas that is an additional byproduct of another on-site process. The gas will flow through the hollow metal tube 2 and will exit through opening 5. In the case of most inert gases, they can be released to the atmosphere without the need for operator intervention. However, in the event that the operator wishes to recycle the gas, any recycle means may be employed.

In the methods of the present invention, the inert gas can be run into the hollow metal tube for the entire time it takes to fill the gas storage tank. The flow rate of the inert gas will be at least 15 standard cubic feet per minute (scfm).

Figure 2:
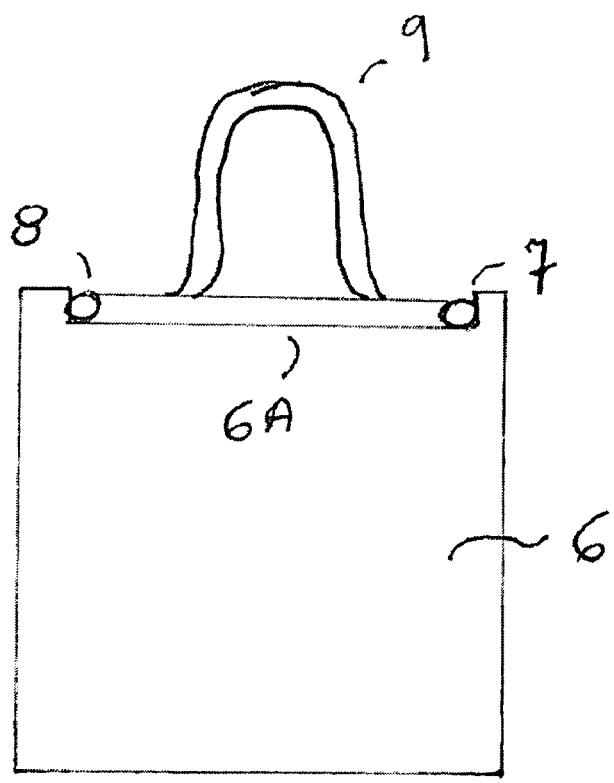
FIG. 2 is a side view of the bayonet fitting showing a bend in the hollow ring assembly.

FIG. 2 is a side view of a bayonet fitting showing the hollow metal tube with a bend in the metal tube which is perpendicular to the plane of the hollow metal tube and the bayonet fitting. The bayonet fitting 6 supports either in a recessed manner or on the flat of its top plane the hollow metal tube 6A. In this embodiment, the hollow metal tube 6A is shown in the recessed position. The inert gas enters the hollow metal tube 6A through opening 7 and exits through opening 8. As noted above, the disposition of the inert gas is at the discretion of the operator of the filling location. The hollow metal tube 6A is bent in a manner such that it rises in a perpendicular fashion 9 so that the hollow metal tube is not all completely in contact with the bayonet fitting 6. This provides the operator with more control of the temperature control function by allowing some of the heated inert gas to flow away from contact with the bayonet fitting 6 through the hollow metal tube 6A.

Figure 3:
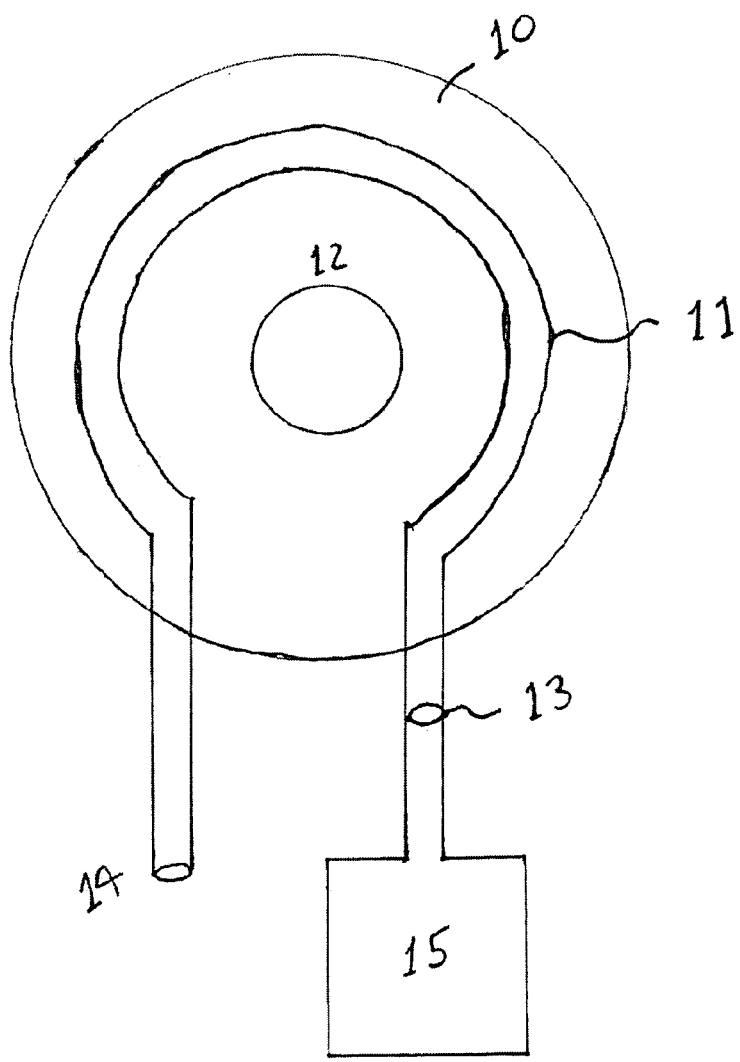
FIG. 3 is a view looking at the end of the bayonet fitting showing the position of the hollow ring and the heat supplying means.

FIG. 3 is an end view of the bayonet fitting showing the position of the hollow metal ring and the heat supply means. The bayonet fitting 10 is shown as it would mount onto the gas storage vessel, not shown. The gas which is being delivered would travel through opening 12 into the storage vessel. The hollow metal tube is depicted here as 11 and can mount either flush to the surface of the bayonet fitting 10 or in a slight recess within the face of the bayonet fitting 10. The inert gas which will provide heating to the hollow metal tube 11 will enter through opening 13 and exit through opening 14. The device that supplies the heat to the gas, the heat supplying means is denoted as 15. This heat supplying means can be any device that will not use a flame or electricity in the event that hydrogen is being supplied as the gas for storage.

The preferred means of supplying heat to the hollow metal tube 11 is by a vortex tube. A vortex tube uses high speed centrifuge to spin compressed gas and separate into 2 parts, warmer gas is produced from the cooler gas. This warmer gas is supplied to the hollow metal tube 11 to provide heat to the bayonet fitting 10. Vortex tubes are commercially available such as those provided by ITW Vortec. Insulation in the form of ceramic paint, not shown in the Figure, is applied on top of the metal tube 11 to improve the heat transfer efficiency. Other forms of insulation materials could readily be employed. Preferably, the heat supplying device will raise the temperature of the hollow metal tube by at least 30° F.

Figure 4:
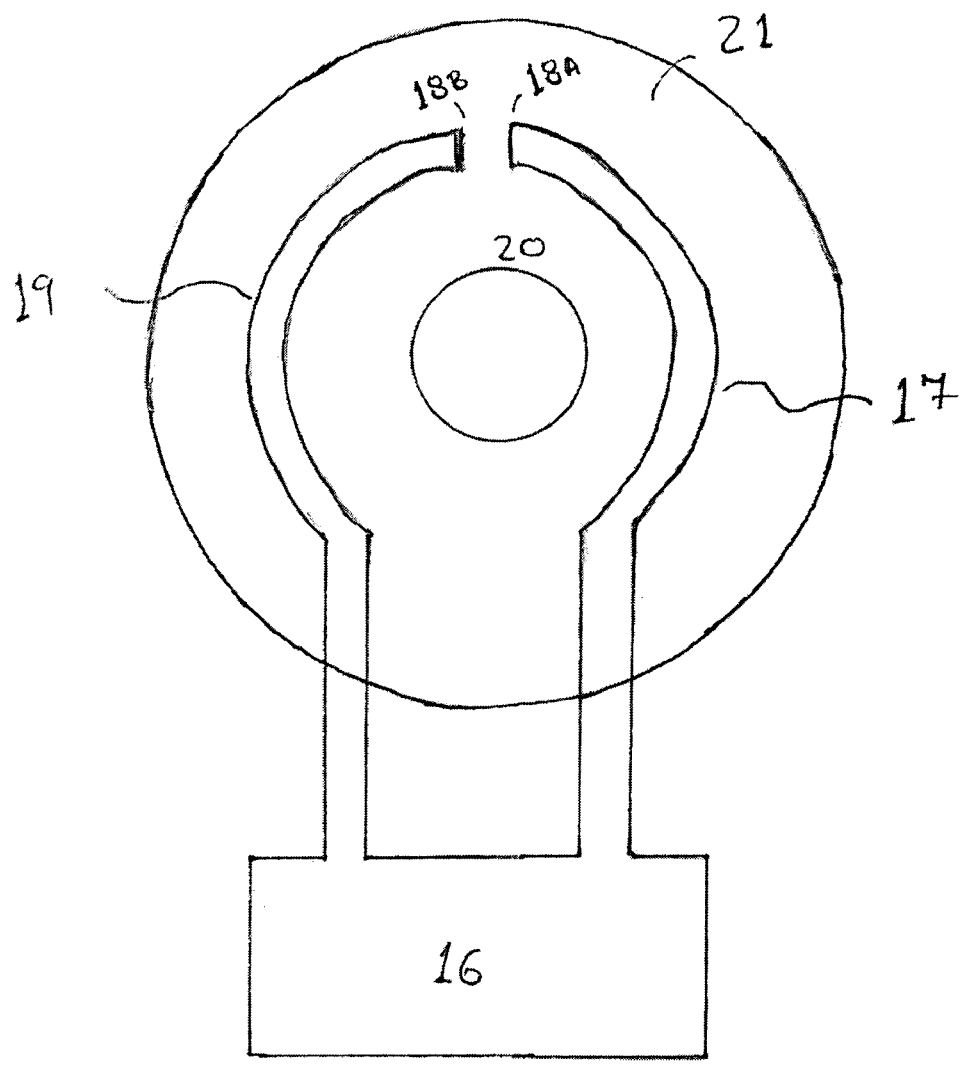
FIG. 4 is a view looking at the end of the bayonet fitting showing the hollow ring split into two separate tubes.

In FIG. 4, there is shown a further embodiment of the present invention whereby the hollow metal tube is divided into two separate tubes. The bayonet fitting 21 is shown as it would mount onto the gas storage vessel which is not shown. The gas being delivered to the gas storage vessel would travel through opening 20 into the storage vessel. The two hollow metal tubes which form a semicircle around the opening 20 can be mounted to the surface of the bayonet fitting 21 or can be mounted in a slight recess within the face of the bayonet fitting. The inert gas is heated by the heat supplying means 16 and will traverse hollow metal tube 17. The other hollow metal tube 19 is also heated by the heat supplying means 16. As noted above, the heat supplying means can be any source that does not use flame or electricity to inhibit any explosion of the gas that may be present in the gas storage tank. The inert gas will exit the hollow metal tubes 17 and 19 through openings 18A and 18B respectively.

EXAMPLES

Testing was performed to determine the effects of heat transfer to a bayonet fitting. A one quarter inch copper tube was inserted into the recess in the bayonet fitting as seen in the description of FIG. 2 above. A Vortex tube made by ITW Vortex was used to supply heat to the hollow copper tube. Nitrogen was employed as the inert gas and was directed into the hollow copper tube via the Vortex tube at a pressure of 100 pounds per square inch (psi) and a flow rate of 15 standard cubic feet per minute (scfm). The temperature of the hollow copper tube was measured at four points. T1 and T4 were measured at the openings in the hollow copper tube where the inert gas is injected and where it exits respectively. The temperatures T2 and T3 were measured at the base of the perpendicular rise in the hollow copper tube as described in FIG. 2. Temperature "F" was also measured and is the temperature of the face of the bayonet fitting.

The testing was performed using a full cylinder of nitrogen gas and ended when the cylinder was finally emptied. The results of this testing are reported in Table 1 below.

TABLE 1

| Cylinder Pressure (psi) | Time (minutes) | T1 (° F.) | T2 (° F.) | T3 (° F.) | T4 (° F.) | F (° F.) |
|---|---|---|---|---|---|---|
| 2500 | 1.00 | 54.2 | | | | 54 |
| 2400 | 2.00 | 86 | 79 | 78 | 74 | 54 |
| 2000 | 3.00 | 122 | 79 | 78 | 74 | 63 |
| 1800 | 5.00 | 135 | 88 | 80 | 70 | 68 |
| 1800 | 10.00 | 137 | 90 | 88 | 73 | 73 |
| 800 | 15.00 | 140 | 81 | 82 | 78 | 74 |
| 500 | 18.00 | 140 | 82 | 85 | 82 | 78 |
| 100 | 20.00 | 130 | 86 | 85 | 82 | 78 |
| 50 | 22.00 | 128 | 87 | 85 | 83 | 82 |
| 0 | 24.00 | | | | | 82 |
| 0 | 25.00 | | | | | 83.8 |

The results of this testing demonstrated that the temperature of the bayonet fitting did increase and to a significant enough degree to thaw ice or inhibit freezing.

While this invention has been described with respect to particular embodiments thereof, it is apparent that numerous other forms and modifications of the invention will be obvious to those skilled in the art. The appending claims in this invention generally should be construed to cover all such obvious forms and modifications which are within the true spirit and scope of the present invention.

I claim:

1. A method for controlling/raising the temperature of a fitting used to transfer liquefied gas to a storage vessel comprising contacting said fitting with a metal tube containing gas and a vortex tube to control its temperature.

2. The method as claimed in claim 1 wherein said liquefied gas is hydrogen.

3. The method as claimed in claim 1 wherein said fitting is a bayonet fitting.

4. The method as claimed in claim 1 wherein said metal tube is selected from a metal selected from the group comprising copper and aluminum.

5. The method as claimed in claim 4 wherein said gas is selected from the group of inert gases comprising nitrogen, argon and helium.

6. The method as claimed in claim 1 wherein the temperature of said metal tube is changed by at least 30° F.

7. The method as claimed in claim 1 wherein said temperature control is not continuous.

8. The method as claimed in claim 1 wherein the flow rate of said gas through said metal tube is at least 15 standard cubic feet per minute.

9. The method as claimed in claim 1 wherein said metal tube consists of two separate metal tubes.

10. A method for inhibiting the freezing of a fitting used to transfer liquefied gas to a storage vessel comprising contacting said fitting with a metal tube containing gas and a vortex tube to control its temperature.

11. The method as claimed in claim 10 wherein said liquefied gas is hydrogen.

12. The method as claimed in claim 10 wherein said fitting is a bayonet fitting.

13. The method as claimed in claim 10 wherein said metal tube is selected from a metal selected from the group comprising copper and aluminum.

14. The method as claimed in claim 13 wherein said gas is selected from the group of inert gases comprising nitrogen, argon and helium.

15. The method as claimed in claim 10 wherein the temperature of said metal tube is changed by at least 30° F.

16. The method as claimed in claim 10 wherein said temperature control is not continuous.

17. The method as claimed in claim 10 wherein the flow rate of said gas through said metal tube is at least 15 standard cubic feet per minute.

18. The method as claimed in claim 10 wherein said hollow metal tube consists of two separate metal tubes.

19. An apparatus for controlling/raising the temperature of a storage vessel fitting comprising:

contact means; insulating means;

gas source means; and a vortex tube.

20. The apparatus as claimed in claim 19 wherein said contact means comprises a hollow metal tube.

21. The apparatus as claimed in claim 20 wherein said hollow metal tube is selected from a metal selected from the group comprising copper and aluminum.

22. The apparatus as claimed in claim 21 wherein said hollow metal tube contains a gas.

23. The apparatus as claimed in claim 19 wherein said gas source means is a gas cylinder.

24. The apparatus as claimed in claim 19 wherein said gas is selected from the group of inert gases comprising nitrogen, argon and helium.

25. The apparatus as claimed in claim 19 wherein said insulating means is ceramic paint.

26. The apparatus as claimed in claim 20 wherein said hollow metal tube comprises two hollow metal tubes.

\* \* \* \* \*